(12) United States Patent
Abernathy et al.

(10) Patent No.: US 7,437,539 B2
(45) Date of Patent: *Oct. 14, 2008

(54) ISSUE UNIT FOR PLACING A PROCESSOR INTO A GRADUAL SLOW MODE OF OPERATION IN RESPONSE TO A DETECTED LIVELOCK CONDITION WITHIN A PROCESSOR PIPELINE

(75) Inventors: Christopher M. Abernathy, Austin, TX (US); Kurt A. Feiste, Austin, TX (US); Ronald P. Hall, Cedar Park, TX (US); Albert J. Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 97 days.

This patent is subject to a terminal disclaimer.

(21) Appl. No.: 11/279,777

(22) Filed: Apr. 14, 2006

(65) Prior Publication Data

US 2007/0245129 A1     Oct. 18, 2007

(51) Int. Cl.
    *G06F 9/30*     (2006.01)
(52) U.S. Cl. ............................................ 712/219
(58) Field of Classification Search ................. 712/219
    See application file for complete search history.

(56) References Cited

U.S. PATENT DOCUMENTS 6,532,574 B1 *  3/2003  Durham et al. ............... 716/6
6,968,431 B2 * 11/2005  Mayfield ...................... 711/146
2003/0115559 A1 *  6/2003  Sawada ......................... 716/5
2004/0093198 A1 *  5/2004  Neifert et al. ................. 703/14
2004/0215933 A1 * 10/2004  Nguyen et al. ............... 712/200
2006/0064695 A1    3/2006  Burns et al.

FOREIGN PATENT DOCUMENTS

WO     WO 99/21081     4/1999

OTHER PUBLICATIONS

U.S. Appl. No. 11/279,775, filed Apr. 14, 2006, Abernathy et al.
Tanenbaum, Andrew S., "Structured Computer Organization", Second Edition, Prentice-Hall, Inc., pp. 10-12, 1984.

* cited by examiner

*Primary Examiner*—Richard Ellis
(74) *Attorney, Agent, or Firm*—Stephen J. Walder, Jr.; D'Ann N. Rifal (57) ABSTRACT

An issue unit for placing a processor into a gradual slow down mode of operation is provided. The gradual slow down mode of operation comprises a plurality of stages of slow down operation of an issue unit in a processor in which the issuance of instructions is slowed in accordance with a staging scheme. The gradual slow down of the processor allows the processor to break out of livelock conditions. Moreover, since the slow down is gradual, the processor may flexibly avoid various degrees of livelock conditions. The mechanisms of the illustrative embodiments impact the overall processor performance based on the severity of the livelock condition by taking a small performance impact on less severe livelock conditions and only increasing the processor performance impact when the livelock condition is more severe.

10 Claims, 6 Drawing Sheets

| THREAD0 CODE | THREAD1 CODE |
|---|---|
| CheckThread1 SPR:<br>    ld R5, 0x100<br>    cmp R4, R5<br>    bneq CheckThread1SPR<br>    mt sprD R6<br>    mt sprE R7<br>    mt sprB R8 | ld R1, 0x2C00<br>mt sprA R3<br>mt sprB R2<br>mt sprC R1<br>store R4 0x100<br>b R10 |

FIG. 7

ISSUE UNIT FOR PLACING A PROCESSOR INTO A GRADUAL SLOW MODE OF OPERATION IN RESPONSE TO A DETECTED LIVELOCK CONDITION WITHIN A PROCESSOR PIPELINE

BACKGROUND

1. Technical Field

The present application relates generally to an improved data processing system and method. More specifically, the present application is directed to a system and method for placing a processor into a gradual slow mode of operation. The slow mode of operation of the processor is used to break out of a livelock condition within the processor core.

2. Description of Related Art

In modern processor design, especially in a simultaneous multi-threading (SMT) processor design, livelock conditions are one of the most difficult problems to find and solve during a design phase, and are often not found until later when the design is implemented in hardware. A livelock condition can be described as a processor executing the same set of instructions repeatedly without making any real progress. One of the root causes of getting into a livelock condition is due to the "harmonic" fixed-cycle interactions between one processor unit and another. Other causes of livelock conditions are repeated flushing and re-fetching of instructions and repeated re-issuing from an issue queue and never completing an instruction because of a repeated flush condition occurring on a resource full or busy condition that is unable to be freed-up.

"Harmonic" fixed-cycle interactions are a product of the fact that, in a processor pipeline, a fixed number of cycles are used to process and complete execution of an instruction. Instructions from multiple threads will be processed through the processor pipeline in a harmonic manner such that each instruction in each thread completes processing at substantially the same time. If there are dependencies between threads of execution, such that one thread requires the results of an instruction in another thread of execution, a livelock condition may occur because both instructions are processed through the processor pipeline at the same time and there are resource and dependency conflicts. The dependent instruction will not be able to complete because the result of the instruction in the other thread is not yet available. If the instructions in the other thread encounter a resource conflict, instructions from both threads will be repeatedly flushed and re-issued to the pipeline.

Figure 6A:
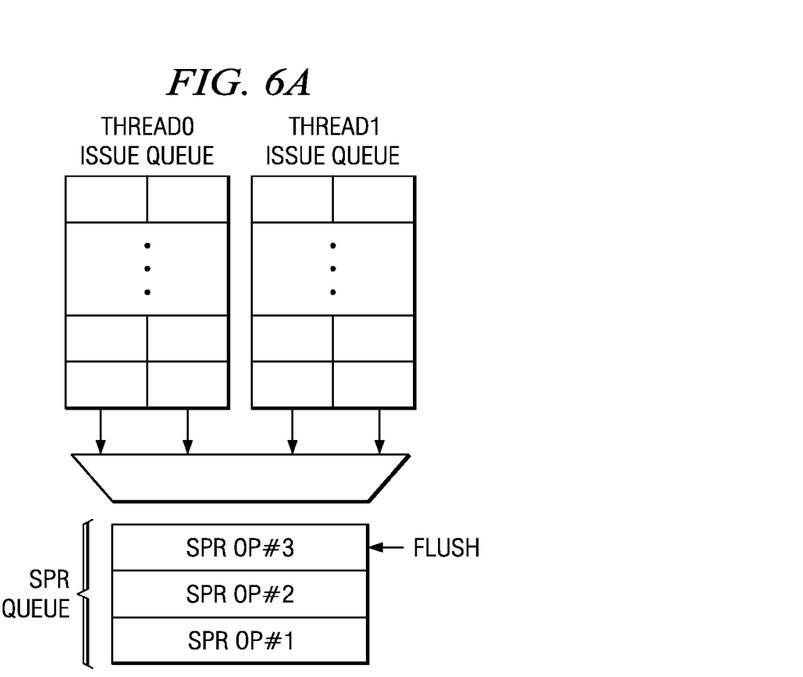
FIG. 6A illustrates a SMT and dual instruction issue processor pipeline design where two instructions are issued from each thread every other cycle.
Figure 6B:
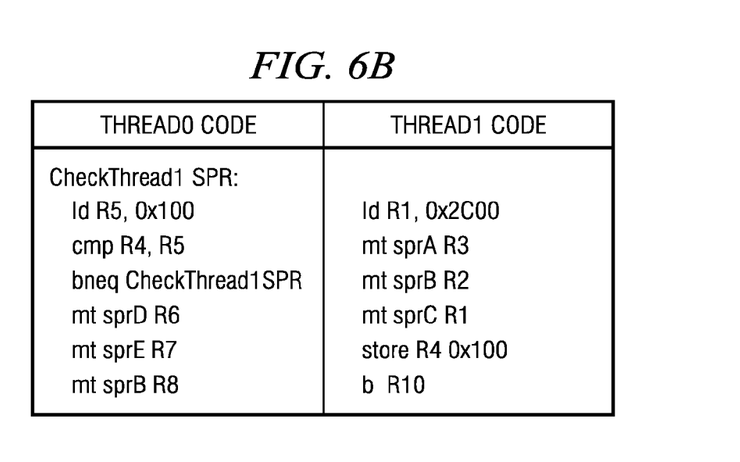
FIG. 6B illustrates exemplary user code which, when executed on the processor pipeline shown in FIG. 6A, causes both threads to try to access a processor's special purpose register (SPR)

An example of code and a dual instruction issue processor design that results in a livelock condition is shown in FIGS. 6A and 6B. FIG. 6A illustrates a SMT and dual instruction issue processor pipeline design, where two instructions are issued from each thread every other cycle. FIG. 6B illustrates exemplary user code which, when executed on the processor pipeline shown in FIG. 6A, causes both threads to try to access a processor's special purpose register (SPR). Thread0 is coded with a Branch-Not-Equal (bneq) instruction to wait on the Thread1 code to complete its SPR access. The Thread0 code will keep branching back and keep checking whether Thread1's "store" instruction is done.

An SPR queue in the processor pipeline design shown in FIG. 6A can only support two SPR instructions at a time. Thus, the third SPR instruction in Thread1, and all instructions behind the third SPR instruction, will always be flushed and re-issued. If both Thread0 and Thread1's instructions are compiled in the order as shown in Table 1 below, all of Thread1's instructions that are ahead of "mt sprC R1" instruction will be completed. Thread1's "mt sprC R1" will get flushed initially because the SPR queue is busy with "mt sprA R3" and "mt sprB R2." All the Thread0's instructions that are after "bneq CheckThread1 SPR" will get issued and flushed as long as Thread1's "store R4 0x100" is not executed.

TABLE 1

Example Code Stream that Creates a Livelock Condition

| Issue Cycle | Issue Slot 0 | Issue Slot 1 |
|---|---|---|
| N | | ld R5, 0x100 |
| n+1 | | ld R1, 0x2C00 |
| n+2 | cmp R4, R5 | bneq CheckThread1 SPR |
| n+3 | mt sprA R3 | mt sprB R2 |
| n+4 | mt sprD R6 | mt sprE R7 (Thread0 flush due to branch misprediction) |
| n+5 | mt sprC R1 | store R4 0x100 (Thread1 flush due to SPR Queue is full) |
| n+6 | Mt sprE R8 | |
| n+7 | b R10 | |

Table 2 illustrates the new code sequence occurring after Thread1's instructions at n+1 and n+3 are completed due to the rest of the instructions in both threads being re-issued, flushed, and re-issued again. As shown in Table 2, Thread1's "mt sprC R1" will again get flushed because Thread0's "mt sprD R6" and "mt sprE R7" are issued ahead of Thread1's "mt sprC R1." These two "move to SPR" instructions in Thread0 will eventually get flushed because of a branch misprediction. These two flush conditions from both threads (Thread0's branch mis-prediction flush and Thread1's third move to SPR instruction) continually flush and the issue is in a "harmonic" window. Therefore, both Thread0's and Thread1's instructions in Table 2 will re-issue and flush over and over again. This will force the processor into a livelock condition.

TABLE 2

Example Code Stream that Creates a Livelock Condition

| Issue Cycle | Issue Slot 0 | Issue Slot 1 |
|---|---|---|
| N | | ld R5, 0x100 |
| n+1 | | |
| n+2 | cmp R4, R5 | bneq CheckThread1 SPR |
| n+3 | | |
| n+4 | Mt sprD R6 | mt sprE R7 (Thread0 flush due to branch misprediction) |
| n+5 | Mt sprC R1 | store R4 0x100 (Thread1 flush due to SPR Queue is full) |
| n+6 | Mt sprE R8 | |
| n+7 | b R10 | |

Livelock conditions, such as that described above, are often detected when real applications are run on the processor hardware. It is often costly and too late to fix the design at this point. Therefore, it is important to have a general method built into the processor core to detect and solve these kind of unexpected livelock conditions that are found in the hardware validation period.

Typically, a hardware-based detection mechanism, which may be hard-coded into the processor design itself, such as in the issue unit of the processor, is provided to detect such livelock conditions. The manner by which the detection mechanism may detect the livelock condition depends upon the particular implementation. For example, the detection mechanism may detect a livelock condition by counting a number of flushes of a particular instruction, or the number of times an instruction re-issues, without completing. Such situations indicate a change of state without forward progress and hence, a potential livelock scenario.

In known designs, in response to detecting the occurrence of a livelock condition using the livelock detection mechanism, the pipeline of the processor is placed into a single-step mode of operation such that only one instruction is completed at a time across one or more threads. However, placing the pipeline of the processor into a single-step mode each time a livelock condition is detected, significantly affects the overall performance of the processor since the livelock condition may occur very often in the execution of a program. This approach is also overkill if this livelock situation has a livelock window, i.e. a period of time in which the livelock condition will continue to be detected in the processor, of only a few processor cycles.

SUMMARY

The illustrative embodiments provide an issue unit for placing a processor into a gradual slow down mode of operation. The gradual slow down of the processor allows the processor to break out of livelock conditions. Moreover, since the slow down is gradual, the processor may flexibly avoid various degrees of livelock conditions. The mechanisms of the illustrative embodiments impact the overall processor performance based on the severity of the livelock condition by taking a small performance impact on less severe livelock conditions and only increasing the processor performance impact when the livelock condition is more severe.

With the mechanisms of the illustrative embodiments, multiple stages of livelock condition detection are provided along with associated livelock condition handling logic. The associated livelock condition handling logic uses different actions that attempt to break out of the livelock condition. Each subsequent stage in the multiple stages is associated with an increasing severity of the livelock condition. Earlier stages are associated with livelock windows that are only a few processor cycles while later stages are associated with livelock windows that are much longer. With each stage, the processor's performance is gradually decreased but the likelihood of breaking out of the livelock condition is increased.

In one illustrative embodiment, slow down mode control logic is provided in an issue unit of a processor pipeline. The slow down mode control logic is coupled to hang detection control logic which is responsible for detecting a livelock condition based on predetermined criteria, e.g., a number of flushes of a particular instruction, or the number of times an instruction re-issues, without completing. In response to detecting a livelock condition, the hang detection control logic asserts a signal to the slow down mode control logic indicating that a livelock condition is present. The slow down mode control logic initiates a gradual slow down operation of the processor.

In accordance with the gradual slow down operation, the slow down mode control logic outputs a signal to stall the flow of instructions through the processor pipeline. This output signal is logically combined, such as via an OR gate, with output signals from other control logic, such as data dependency control logic. Thus, if either the slow down mode control logic or the other control logic outputs a signal to stall the movement of the instruction through the processor pipeline, then the instruction is stalled. When these signals are not asserted, the instruction is allowed to flow through the pipeline in a normal manner.

The slow down mode control logic outputs the signal to stall the flow of instructions in accordance with a staging scheme that is either hardwired or programmed into the slow down mode control logic. For example, if the hang detection control logic detects the livelock (or hang) condition, i.e. that there are X number of flushes without an instruction being committed (where X may be programmed after hardware validation), the slow down mode control logic may slow down the issue unit such that an instruction is issued by the issue unit only every N processor cycles, where N may be programmed after hardware validation). The slow down of the issue unit may be performed by asserting a signal to stall movement of instructions through the pipeline. This signal may be asserted for a predetermined number of cycles, e.g., N cycles, such that only one instruction is issued every N processor cycles.

If this same livelock condition occurs again, i.e. X number of flushes without an instruction being committed, the issue unit is slowed down again such that the issue unit may issue one instruction every 2N processor cycles. If the livelock condition is again detected, the issue unit is slowed down again such that the issue unit may issue one instruction every 4N processor cycles. Thereafter, if the livelock condition is detected yet again, the processor is determined to be in a severe livelock condition. In such a case, the issue unit is forced into a serial single-step mode that allows only one instruction to issue with no other instructions being allowed to issue until the previous instruction is completed. When the issue unit drains all instructions in the issue and dispatch pipeline of the issue unit, the processor is returned to a normal full speed mode of operation. The processor is returned to this normal full speed mode of operation in any of the previous stages of the staging scheme if the livelock condition is no longer detected.

In one illustrative embodiment, an issue unit is provided that comprises livelock detection control logic, slow mode control logic coupled to the livelock detection logic, and an issue and dispatch pipeline coupled to the livelock detection control logic and slow mode control logic. The livelock detection control logic may detect a livelock condition in the issue and dispatch pipeline. The slow mode control logic may gradually stall movement of instructions through the issue and dispatch pipeline by an increasing number of processing cycles while the livelock condition continues to be detected by the livelock detection control logic. The slow mode control logic may return the data processing device to a full speed mode of operation in response to detecting that the livelock condition has been broken.

The livelock detection logic may monitor a completion unit of a processor associated with the issue unit to determine if a predetermined number of processor cycles have occurred without an instruction being completed successfully. The livelock detection logic may include a counter for counting a number of processor cycles that have occurred without an instruction being completed successfully as indicated by the completion unit. A livelock condition may be detected in response to the counter reaching a predetermined threshold value.

The slow mode control logic may include a counter for counting a number of sequential times the livelock condition is detected by the livelock detection logic. The slow mode control logic may increase the number of processing cycles that movement of instructions through the issue and dispatch pipeline is stalled based on incrementing of the counter.

The issue unit may further comprise other control logic of the issue unit for shifting or stalling movement of instructions through the issue and dispatch pipeline based on other criteria. The issue unit may also comprise a logic gate coupled to the other control logic and the slow mode control logic, wherein the logic gate receives inputs from the other control logic and the slow mode control logic indicative of whether to stall or shift instructions through the issue and dispatch pipeline. The logic gate may send an output signal to the issue and dispatch pipeline to either stall or shift instructions through the issue and dispatch pipeline.

The slow mode control logic may gradually stall movement of instructions through the issue and dispatch pipeline by setting the issue unit to a reduced speed mode of operation, in response to the livelock detection control logic detecting the livelock condition, in accordance with a staging scheme. The staging scheme may have a plurality of stages that slow down movement of instructions through the issue and dispatch pipeline by differing amounts of processing cycles.

The slow mode control logic may set the issue unit to a reduced speed mode of operation by placing the issue unit in a first slowed-down stage of operation in which movement of instructions through the issue and dispatch pipeline is delayed by a first number of processing cycles and determining if the livelock condition continues to be detected by the livelock detection control logic after placing the issue unit in the first slowed-down stage of operation. The slow mode control logic may place the issue unit in a second slowed-down stage of operation in which movement of instructions through the issue and dispatch pipeline is delayed by a second number of processing cycles, greater than the first number of processing cycles, if the livelock condition continues to be detected by the livelock detection control logic after placing the issue unit in the first slowed-down stage of operation.

A last stage of the staging scheme may set the issue unit to a serial single-step mode of operation that allows only one instruction to issue from the issue and dispatch pipeline with no other instructions being allowed to issue from the issue and dispatch pipeline until the instruction is completed.

Criteria for detecting the livelock condition may be programmed into the livelock detection control logic after hardware manufacturing of a processor in which the issue unit is a part. Moreover, a base number of processing cycles by which to delay issuance of instructions for each stage of the staging scheme may be programmed into the slow mode control logic after hardware manufacturing of a processor in which the issue unit is a part.

In yet another illustrative embodiment, a method of providing an issue unit in a processor of a data processing device is provided. The method may comprise, for example, providing livelock detection control logic, providing a slow mode control logic coupled to the livelock detection logic, and providing an issue and dispatch pipeline coupled to the livelock detection control logic and slow mode control logic. The livelock detection control logic may detect a livelock condition in the issue and dispatch pipeline. The slow mode control logic may gradually stall movement of instructions through the issue and dispatch pipeline by an increasing number of processing cycles while the livelock condition continues to be detected by the livelock detection control logic. The slow mode control logic may return the data processing device to a full speed mode of operation in response to detecting that the livelock condition has been broken.

The method may further comprise providing the livelock detection logic with logic for monitoring a completion unit of a processor associated with the issue unit to determine if a predetermined number of processor cycles have occurred without an instruction being completed successfully. The method may comprise providing a counter in the livelock detection logic for counting a number of processor cycles that have occurred without an instruction being completed successfully as indicated by the completion unit. A livelock condition may be detected in response to the counter reaching a predetermined threshold value.

The method may further comprise providing a counter in the slow mode control logic for counting a number of sequential times the livelock condition is detected by the livelock detection logic. The slow mode control logic may increase the number of processing cycles that movement of instructions through the issue and dispatch pipeline is stalled based on incrementing of the counter.

The method may also comprise providing other control logic of the issue unit for shifting or stalling movement of instructions through the issue and dispatch pipeline based on other criteria. Moreover, the method may comprise providing a logic gate coupled to the other control logic and the slow mode control logic. The logic gate may receive inputs from the other control logic and the slow mode control logic indicative of whether to stall or shift instructions through the issue and dispatch pipeline. The logic gate may send an output signal to the issue and dispatch pipeline to either stall or shift instructions through the issue and dispatch pipeline.

The method may further comprise providing the slow mode control logic with logic to gradually stall movement of instructions through the issue and dispatch pipeline by setting the issue unit to a reduced speed mode of operation, in response to the livelock detection control logic detecting the livelock condition, in accordance with a staging scheme. The staging scheme may have a plurality of stages that slow down movement of instructions through the issue and dispatch pipeline by differing amounts of processing cycles.

The method may further comprise providing the slow mode control logic with logic to set the issue unit to a reduced speed mode of operation by placing the issue unit in a first slowed-down stage of operation in which movement of instructions through the issue and dispatch pipeline is delayed by a first number of processing cycles. The logic may further determine if the livelock condition continues to be detected by the livelock detection control logic after placing the issue unit in the first slowed-down stage of operation and may place the issue unit in a second slowed-down stage of operation in which movement of instructions through the issue and dispatch pipeline is delayed by a second number of processing cycles, greater than the first number of processing cycles, if the livelock condition continues to be detected by the livelock detection control logic after placing the issue unit in the first slowed-down stage of operation.

A last stage of the staging scheme may set the issue unit to a serial single-step mode of operation that allows only one instruction to issue from the issue and dispatch pipeline with no other instructions being allowed to issue from the issue and dispatch pipeline until the instruction is completed. Criteria for detecting the livelock condition may be programmed into the livelock detection control logic after hardware manufacturing of a processor in which the issue unit is a part. Moreover, a base number of processing cycles by which to delay issuance of instructions for each stage of the staging scheme may be programmed into the slow mode control logic after hardware manufacturing of a processor in which the issue unit is a part.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
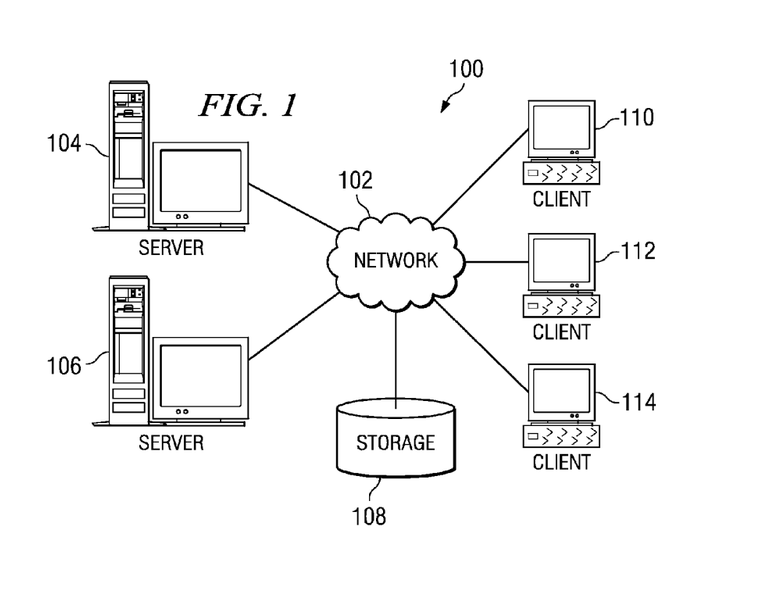
FIG. 1 is an exemplary diagram of a distributed data processing system in which aspects of the illustrative embodiments may be implemented.
Figure 2:
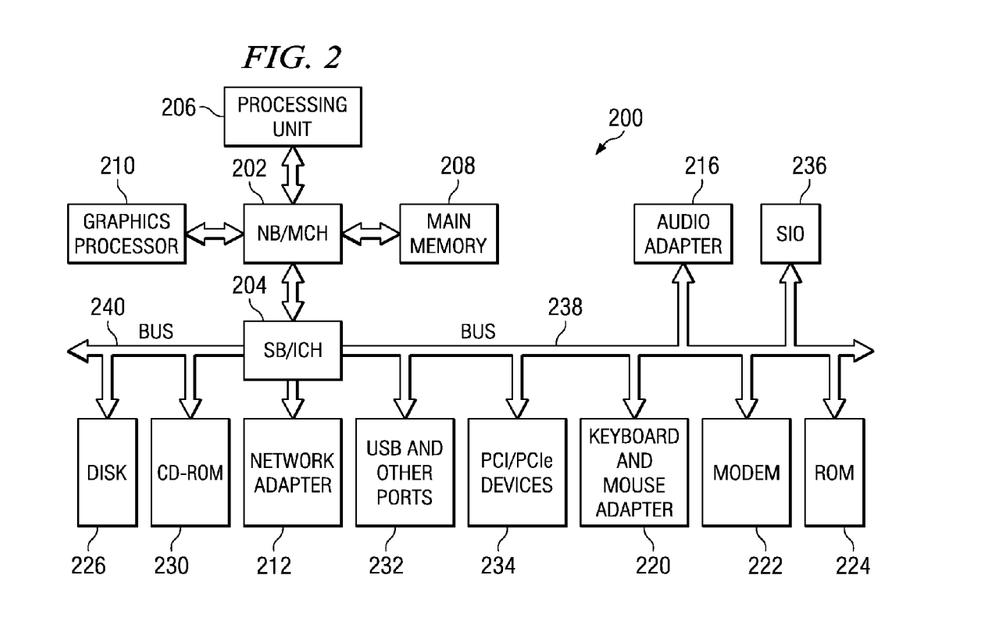
FIG. 2 is an exemplary block diagram of a data processing device in which aspects of the illustrative embodiments may be implemented.

The illustrative embodiments provide a system and method for placing a processor into a gradual slow down mode of operation in order to break out of a livelock condition. The illustrative embodiments may be implemented in any processor of any computing device. For example, the illustrative embodiments may be used in any of a server computing device, client computing device, communication device, portable computing device, or the like. FIGS. 1-2 are provided hereafter as examples of a distributed data processing environment and computing devices in which exemplary aspects of the illustrative embodiments may be implemented. FIGS. 1-2 are only exemplary and are not intended to state or imply any limitation with regard to the types of computing devices in which the illustrative embodiments may be implemented. To the contrary, the illustrative embodiments may be implemented in any processor regardless of the particular machine or computing device in which the processor is ultimately operating.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
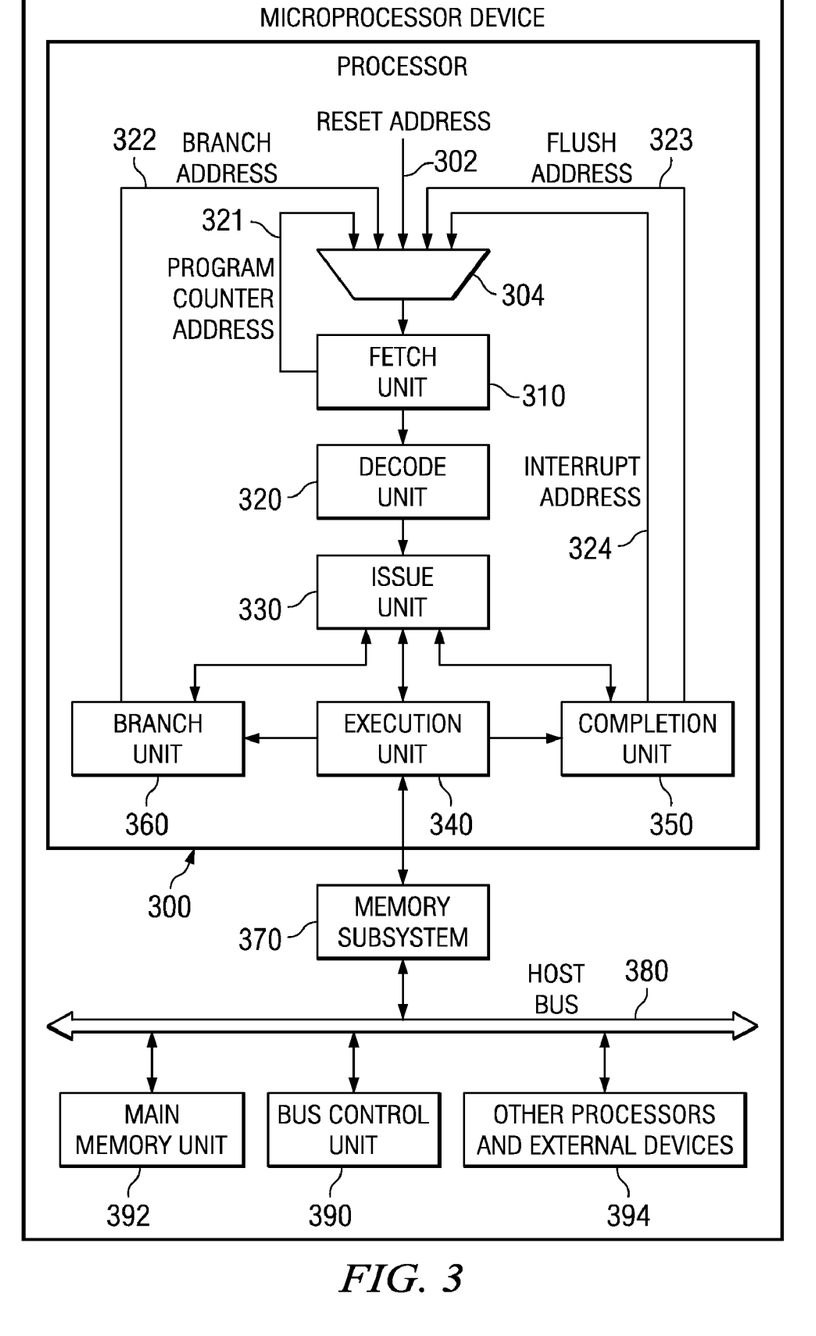
FIG. 3 is an exemplary diagram illustrating a pipeline of a processor in accordance with one illustrative embodiment.

FIG. 3 is an exemplary diagram illustrating a pipeline of a processor in accordance with one illustrative embodiment. As shown in FIG. 3, the processor 300 includes a processor pipeline comprised of a fetch address multiplexer 304, a fetch unit 310, decode unit 320, issue unit 330, execution unit 340, completion unit 350, and branch unit 360. The processor 300 is coupled to memory subsystem 370, host bus 380, bus control unit 390, main memory unit 392, and other processor and external devices 394, such as those depicted in FIG. 2, for example.

With the above arrangement of elements, typically, a livelock condition can be described as the same set of instructions in a processor flow from fetch address multiplexer 304 to fetch unit 310, decode unit 320, issue unit 330, completion unit 350, and back to fetch address multiplexer 304 via the flush address path 323 over and over again multiple times without making any real progress by committing any instructions. As mentioned above, one or the root causes of such livelock conditions is the "harmonic" fixed-cycle interactions between one processor unit and another, instructions repeatedly flushing and refetching, or repeatedly reissuing from the issue queue of the issue unit 330 and never completing because of a repeated flush condition occurring on a resource full or busy condition that is unable to be freed-up.

The illustrative embodiments provide a mechanism for gradually stalling the issuing of instructions by the issue unit 330 in response to the detection of a livelock condition. In one illustrative embodiment, multiple stages of livelock condition detection are provided in the issue unit 330 along with associated livelock condition handling logic. The associated livelock condition handling logic uses different actions that attempt to break out of the livelock condition. Each subsequent stage in the multiple stages is associated with an increasing severity of the livelock condition. Earlier stages are associated with livelock windows that are only a few processor cycles while later stages are associated with livelock windows that are much longer. With each stage, the processor's performance is gradually decreased but the likelihood of breaking out of the livelock condition is increased.

In one illustrative embodiment, slow down mode control logic is provided in the issue unit 330 of the processor pipeline. The slow down mode control logic is coupled to livelock (or hang) detection control logic which is responsible for detecting a livelock condition based on predetermined criteria, e.g., a number of flushes of a particular instruction, or the number of times an instruction re-issues, without completing. In response to detecting a livelock condition, the livelock detection control logic asserts a signal to the slow down mode control logic indicating that a livelock condition is present. The slow down mode control logic initiates a gradual slow down operation of the processor 300 by stalling the issuance of instructions from the issue unit 330.

In accordance with the gradual slow down operation, the slow down mode control logic outputs a signal to stall the flow of instructions through the processor pipeline. This output signal is logically combined, such as via an OR gate, with output signals from other control logic, such as data dependency control logic, of the issue unit 330. Thus, if either the slow down mode control logic or the other control logic outputs a signal to stall the movement of the instruction through the issue and dispatch pipeline of the issue unit 330, then the instruction is stalled. When these signals are not asserted, the instruction is allowed to flow through the issue and dispatch pipeline of the issue unit 330 in a normal manner.

The slow down mode control logic outputs the signal to stall the flow of instructions in accordance with a staging scheme that is either hardwired or programmed into the slow down mode control logic. For example, if the livelock detection control logic detects the livelock (or hang) condition, i.e. that there are X number of flushes without an instruction being committed (where X may be programmed after hardware validation), the slow down mode control logic may slow down the issue unit 330 such that an instruction is issued by the issue unit 330 only every N processor cycles, where N may be programmed after hardware validation). The slow down of the issue unit 330 may be performed by asserting a signal to stall movement of instructions through the issue unit 330. This signal may be asserted for a predetermined number of cycles, e.g., N cycles, such that only one instruction is issued every N processor cycles.

The number of cycles that the issue unit 330 is stalled may be increased with each subsequent detection of the same livelock condition. In other words, as the livelock condition is detected with each subsequent consecutive re-issue of an instruction, the number of cycles that the issue unit is stalled may be increased. When the livelock condition is detected a predetermined number of times, the processor 300 is determined to be in a severe livelock condition. In such a case, the issue unit 330 may be forced into a serial single-step mode that allows only one instruction to issue with no other instructions being allowed to issue until the previous instruction is completed.

When the issue unit 330 drains all instructions in the issue and dispatch pipeline of the issue unit 330, the processor 300 is returned to a normal full speed mode of operation. The processor 300 is returned to this normal full speed mode of operation in any of the previous stages of the staging scheme if the livelock condition is no longer detected.

Figure 4:
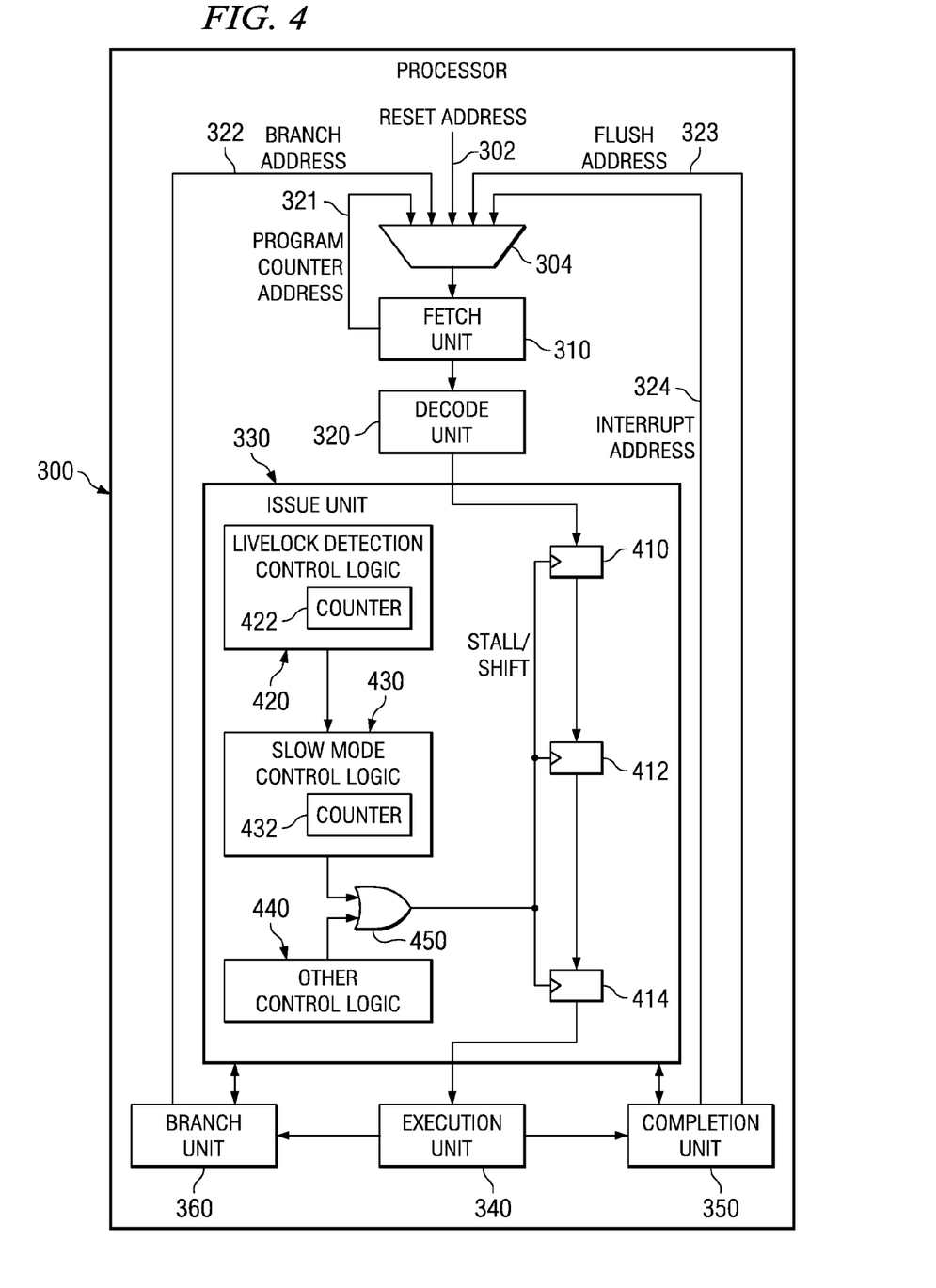
FIG. 4 is an exemplary diagram illustrating details of an issue unit in accordance with one illustrative embodiment.

FIG. 4 is an exemplary diagram illustrating details of an issue unit in accordance with one illustrative embodiment. As shown in FIG. 4, the issue unit 330 includes a plurality of registers 410-414 that together comprise an issue and dispatch pipeline of the issue unit 330. The issue unit 330 further includes livelock (or hang) detection control logic 420, slow mode control logic 430, and other control logic 440 for controlling the movement of instructions through the issue and dispatch pipeline. Outputs from the slow mode control logic 430 and the other control logic 440 are provided to OR gate 450 which outputs a stall/shift signal to the registers 410-414 to either shift the instructions stored in these registers to the next register in the issue and dispatch pipeline (or issue the instruction to the execution unit 340), or to stall the instructions for a processor cycle.

With the processor pipeline shown in FIG. 4, an instruction fetch address is selected by the multiplexer 304 from one of the program counter address input 321, the branch address input 322 from branch unit 360, a reset address 325, a flush address 323 from completion unit 350, or an interrupt address 324 from completion unit 350. The fetch address is provided to fetch unit 310 which fetches the appropriate instruction from memory. The fetch unit 310 will typically attempt to fetch the instruction from the L1 instruction cache, and if the instruction is not present in the L1 instruction cache, the fetch unit 310 will try to retrieve the instruction from the L2 memory cache. If the instruction is also not present in the L2 memory cache, the fetch unit 310 will retrieve the instruction from the slower system memory.

After the fetch unit 310 fetches the instruction, the fetch unit 310 provides the instruction to the decode unit 320. The decode unit 320 is responsible for determining what the particular instruction does. The decode unit 320 consults a memory (not shown) that exists inside the processor 300, e.g., a read-only memory (ROM), that stores the microcode for each instruction that the processor understands. The microcode for an instruction provides a step-by-step guide as to how that particular instruction is to be executed by execution units, e.g., execution unit 340, of the processor 300. For example, if the loaded instruction is a+b, then the microcode will tell the decode unit 320 that it needs two parameters, a and b. The decode unit 320 will then request the fetch unit 310 to retrieve the data present in the next two memory positions which fit the values for a and b. After the decode unit 320 has decoded and "translated" the instruction, and retrieved all required data to execute the instruction, the data and the decoded instruction are passed to the issue unit 330.

The instruction and data are placed into a first register 410 of the issue and dispatch pipeline and, unless a stall condition is detected either by the livelock detection control logic 420 or other control logic 440, the instructions and data are permitted to shift through the pipeline with each processor cycle, from one register to another until the instruction and data are issued to the execution unit 340. Although a single execution unit 340 is shown in FIG. 4 for simplicity, it should be appreciated that most modern computers have more than one execution unit 340 of the same or different types. Thus, execution unit 340 is meant to represent one or more execution units of the same or different types, e.g., integer, floating point, etc.

The livelock detection control logic 420 monitors the completion unit 350 to determine if a predetermined number of processor cycles have occurred without an instruction being completed successfully. That is, based on the processing of an instruction performed by the execution unit 340, the execution unit 340 informs the completion unit 350 whether a exception has occurred, whether a flush of the issue and dispatch pipeline should be performed, or whether the instruction is to be committed, i.e. successfully completed. The completion unit 350 may then communicate such information to the issue unit 330.

The livelock detection control logic 420 may include a counter 422 or other logic for maintaining a count of how many processor cycles have elapsed between instructions being committed by the completion unit 350. This counter 422 or other logic, may be incremented each time the issue and dispatch pipeline is flushed and an instruction is re-issued to the issue and dispatch pipeline of the issue unit 330, for example. When the counter 422, or other logic, reaches a predetermined number of flushes threshold value X without being reset due to an instruction being committed, the livelock detection control logic 420 asserts a slow mode signal to the slow mode control logic 430 indicating that the slow mode control logic 430 should transition to a next state of slow down control of the processor 300. For example, when the count threshold value is met by the counter value, a counter 432 in the slow mode control logic 430 may be incremented and an appropriate stall signal is asserted to the OR gate 450.

The stall signal causes the flow of instructions through the issue and dispatch pipeline, i.e. registers 410-414, to stall for one processor cycle. The slow mode control logic 430 may continue to assert the stall instruction for subsequent processor cycles up to a threshold number of processor cycles (counter)xN, where N is a basic threshold number of processor cycles to stall. Thus, for example, if N is 4, then the first time that the slow mode signal is asserted to the slow mode control logic 430, the slow mode control logic 430 will assert the stall signal for 4 processor cycles and then allow an instruction to issue from the issue unit 330, i.e. allow the instructions to shift from register to register 410-414 in the issue and dispatch pipeline until one instruction issues from the issue unit 330. The next instruction has to wait 4 processor cycles before it can be issued. The basic threshold number of processor cycles to stall N may be programmed into the slow mode control logic 430 after hardware validation, for example.

In this way, the issue and dispatch pipeline is slowed such that only one instruction is permitted to issue from the issue unit 330 every N number of processor cycles. This process may be repeated with the livelock detection control logic 420 continuing to monitor whether instructions are committed and the number of flushes between instructions being committed.

After asserting the slow mode signal, the livelock detection control logic 420 resets its counter back to an initial value and begins counting the number of flushes of the issue and dispatch pipeline between committed instructions. Each time the predetermined number of flushes threshold value X is met by the counter 422 in the livelock detection control logic 420, the livelock detection control logic 420 asserts the slow mode signal to the slow mode control logic 430. The counter 433 in the slow mode control logic 430 is incremented and the new counter value is used to cause the slow mode control logic 430 to stall the movement of instructions through the issue and dispatch pipeline for (counter)xN processor cycles.

Taking the example value of N above, i.e. 4 processor cycles, the first time the livelock condition is detected by the livelock detection control logic 420, the instructions in the issue and dispatch pipeline comprised of registers 410-414 are stalled for 4 processor cycles. Thereafter, with subsequent livelock detections, the instructions are stalled for multiples of 4 processor cycles, e.g., 8, 12, and 16 processor cycles.

Once the value of the counter 432 reaches a predetermined serious livelock condition threshold value, the slow mode control logic 430 causes the issue and dispatch pipeline to be placed into a serial single step mode of operation. This serial single step mode of operation is similar to known single step modes of operation where only one instruction is permitted to issue until it is successfully completed. Once all of the instructions in the issue and dispatch pipeline are issued, the issue unit 330 is permitted to go back to a full speed mode of operation in which instructions are allowed to flow through the issue and dispatch pipeline until a livelock condition is again detected. Similarly, in each slow down stage, i.e. each slow down after assertion of the slow mode signal, if all the instructions in the issued and dispatch pipeline are drained without seeing the condition of X times of flushes without one instruction being committed, then the issue unit 330 is permitted to return to full speed mode.

Figure 5:
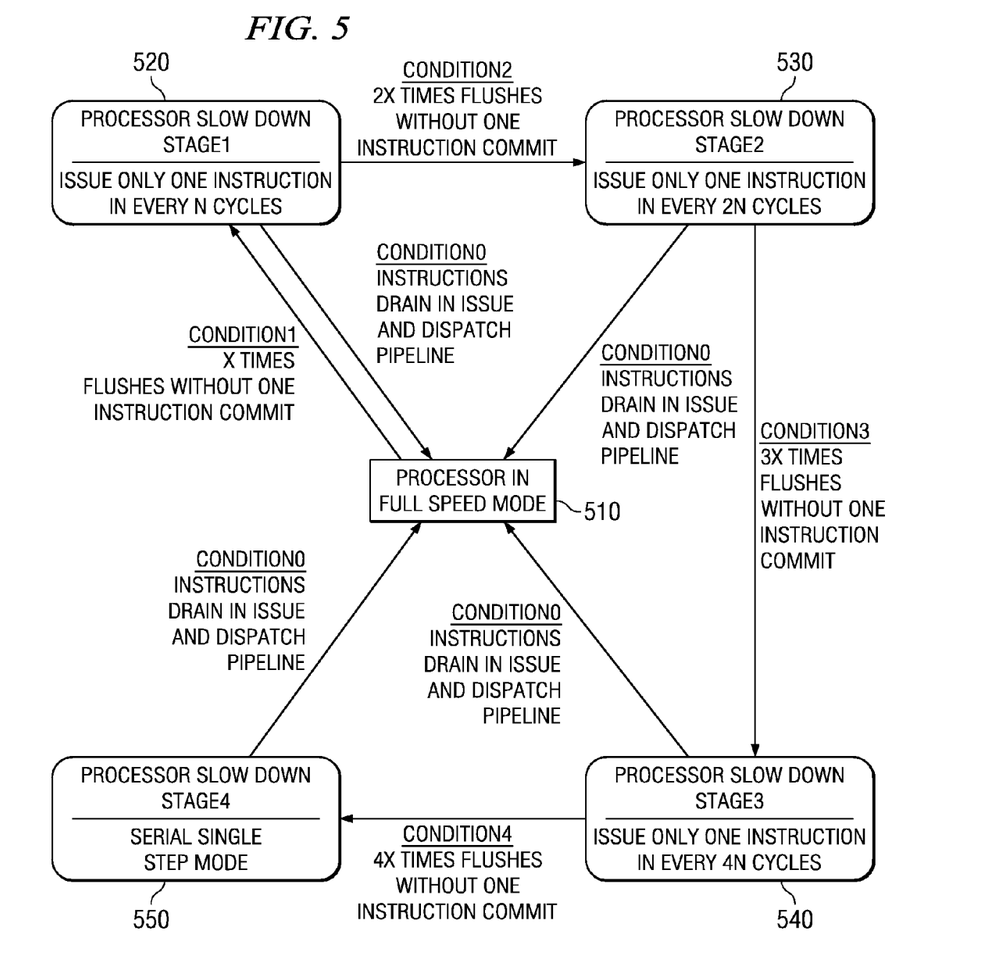
FIG. 5 is an exemplary diagram illustrating a staging scheme for an operation of a livelock condition detection and slow down mechanism in accordance with one illustrative embodiment.

The various slow down stages through which the slow mode control logic 420 progresses as more serious livelock conditions are detected are outlined in FIG. 5. It should be noted that while the illustrative embodiments make use of particular multiples of the number of flushes between instructions being committed and particular multiples of number of processor cycles to stall instructions in the issue and dispatch pipeline, the present invention is not limited to such multiples. To the contrary, any values for the number of flushes between instructions being committed or the number of processor cycles to stall for each of the stages may be used without departing from the spirit and scope of the present invention. In fact, in some illustrative embodiments, these values may not be multiples of each other at all and may be specific values programmed into the livelock detection control logic 420 and/or slow mode control logic 430.

FIG. 5 is an exemplary diagram illustrating a staging scheme for an operation of a livelock condition detection and slow down mechanism in accordance with one illustrative embodiment. As shown in FIG. 5, normally the processor, and hence the issue unit of the processor, operates in a full speed mode of operation 510. When a first livelock condition is detected, i.e. X number of flushes without one instruction committing, the processor will transition to processor slow down stage1 520. In processor slow down stage1 520, the issue unit will only issue one instruction on every N cycles.

If the issue unit drains all the instructions in the issue and dispatch pipeline without seeing the condition of X times of flushes without 1 instruction being committed, the processor returns to the full speed mode of operation 510. Otherwise, the processor transitions to processor slow down stage2 530 in which the issue unit will issue one instruction on every 2N cycles.

In processor slow down stage2 530, if the issue unit drains all the instructions in the issue and dispatch pipeline without seeing the condition of X times of flushes without one instruction being committed, the processor returns to the full speed mode of operation 510. Otherwise, the processor transitions to processor slow down stage3 540 where the issue unit only issues one instruction on every 4N cycles. If the issue unit drains all the instructions in the issue and dispatch pipeline without seeing the condition of X times of flushes without one instruction being committed, the processor returns to the full speed mode of operation 510.

If the condition of X times of flushes without one instruction being committed is encountered, the processor is determined to be in a severe livelock condition and transitions to processor slow down stage4 550. In processor slow down stage4 550, the issue unit is forced into a serial single-step mode of operation in which only one instruction is issued until it is completed. When the issue unit drains all the instructions in the issue and dispatch pipeline, the processor then returns to the full speed mode of operation 510.

As an example operation of the illustrative embodiments, consider again the scenario illustrated in FIGS. 6A and 6B discussed above in the Background of the Invention. It is assumed that this situation occurs often in the execution of a program and that there are 12 instructions in the issue and dispatch pipeline. If the livelock window is only 4 processor cycles, the livelock condition will occur when the third move-to-spr instruction, mt sprC R1 is issued within 4 cycles after the second move-to-spr instruction, mt sprE R7. If each instruction takes 10 processor cycles to complete, it will take approximately 120 cycles to drain all the instructions from the issue and dispatch pipeline when the processor transitions from full speed mode to serial single-step mode.

However, with the illustrative embodiments described herein, it may take less than 60 processor cycles to drain all the instructions if N is set to be 4 in processor slow down stage1 520. Thus, the illustrative embodiments double the performance of the processor when compared to known mechanisms that would immediately transition to the serial single-step mode of operation. When this type of livelock condition occurs often in a program, the illustrative embodiments significantly minimize the impact of livelock conditions on the overall performance of the processor.

Figure 7:
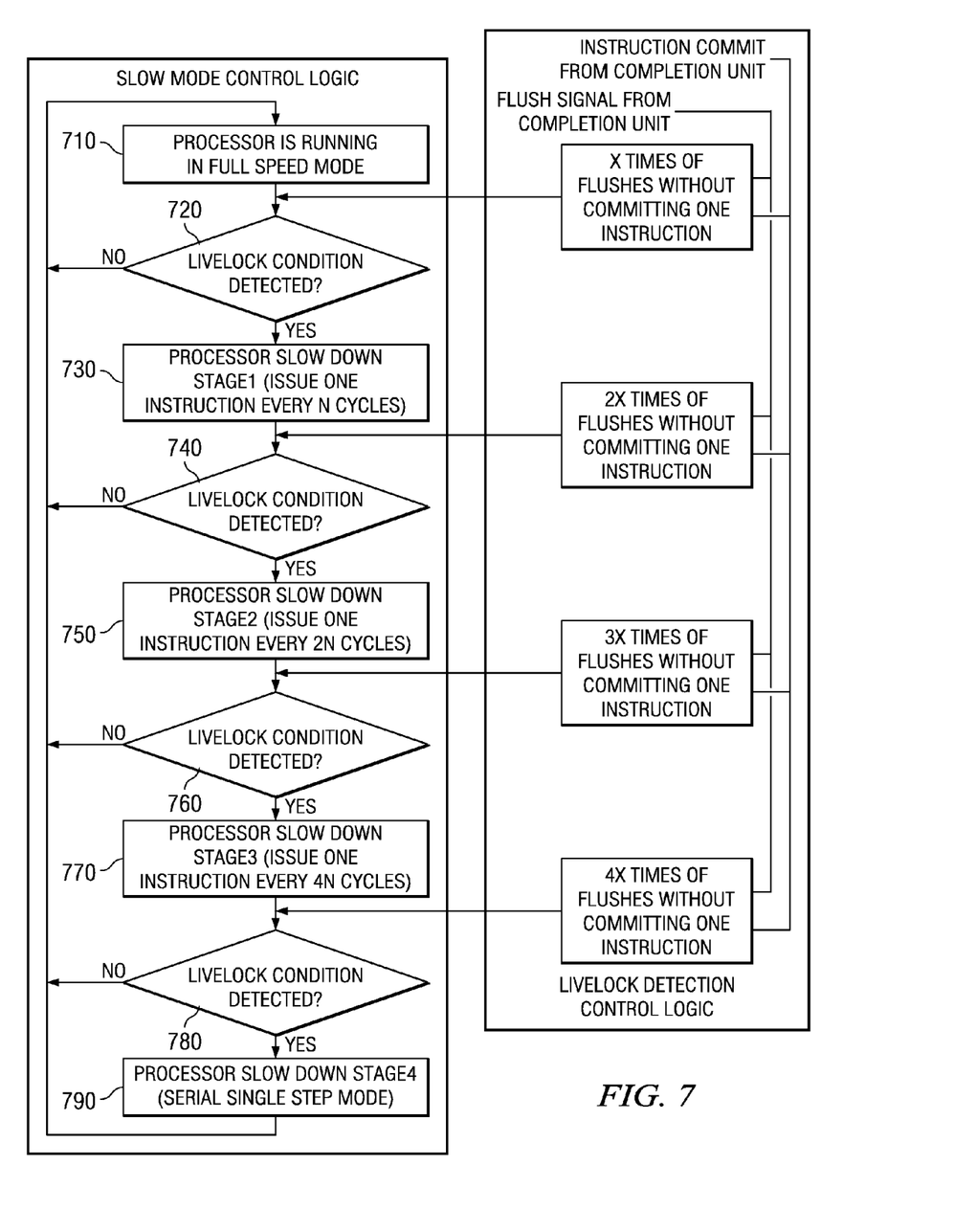
FIG. 7 is a flowchart outlining an exemplary operation for detecting a livelock condition and slowing down an operation of a processor pipeline in accordance with one illustrative embodiment.

FIG. 7 is a flowchart outlining an exemplary operation for detecting a livelock condition and slowing down an operation of a processor pipeline in accordance with one illustrative embodiment. The operation outlined in FIG. 7 may be performed, for example, within an issue unit of a processor, such as issue unit 330 in FIGS. 3 and 4 above. Thus, the various operations shown in FIG. 7 may be implemented in hardware of a processor. The processor may be in a single processor system or multiple processor system. In one exemplary embodiment, the processor may be part of a microprocessor or system-on-a-chip. The microprocessor or system-on-a-chip may include multiple processors operating on the same or different instruction sets. For example, the microprocessor or system-on-a-chip may be a heterogeneous device in which some processors operate using a first instruction set, e.g., a RISC instruction set, while other processors operate using a second instruction set, e.g., a vector instruction set. The types and arrangements of devices in which the processor may be implemented is not limited by this description or the spirit and scope of the present invention.

As shown in FIG. 7, the operation starts with the processor, and thus the issue unit, running in a full speed mode of operation (step 710). The issue unit determines if a livelock condition is detected (step 720). If not, the operation returns to step 710 and the processor and issue unit continue to run at full speed. If a livelock condition is detected, as determined by livelock detection control logic 420 in FIG. 4, for example, then the processor and issue unit transition to processor slow down stage1 where an instruction is issued only every N processor cycles (step 730). As shown in FIG. 7, the determination that a livelock condition is present may be based on the livelock detection control logic 420 detecting that X times of flushes have occurred without committing one instruction, for example.

Thereafter, the issue unit determines is a livelock condition is again detected (step 740). If not, the processor and issue unit may return to a full speed mode of operation (step 710). If a livelock condition is again detected, the processor and issue unit transition to processor slow down stage2 where one instruction is issued every 2N processor cycles (step 750). As shown, the determination of whether a livelock condition is again detected may be based on the livelock detection control logic 420 detecting that 2x times of flushes have occurred without committing one instruction, for example.

Thereafter, the issue unit again determines is a livelock condition is detected (step 760). If not, the processor and issue unit may return to a full speed mode of operation (step 710). If a livelock condition is again detected, the processor and issue unit transition to processor slow down stage3 where one instruction is issued every 4N processor cycles (step 770). As shown, the determination of whether a livelock condition is again detected may be based on the livelock detection control logic 420 detecting that 3x times of flushes have occurred without committing one instruction, for example.

Thereafter, the issue unit determines is a livelock condition is again detected (step 780). If not, the processor and issue unit may return to a full speed mode of operation (step 710). If a livelock condition is again detected, the processor and issue unit transition to processor slow down stage4 where the issue unit goes into a serial single step mode of operation, such as generally known in the prior art (step 790). As shown, the determination of whether a livelock condition is again detected may be based on the livelock detection control logic 420 detecting that 4x times of flushes have occurred without committing one instruction, for example.

Thereafter, the livelock condition will be broken via the serial single step mode of operation as is generally known in the art. Thus, the processor and issue unit are returned to a full speed mode of operation (step 710). This operation continues while the processor is operational and may be terminated when the processor is brought off-line.

Thus, the illustrative embodiments provide a mechanism for breaking out of a livelock condition in a processor by providing a gradual slow down mechanism for slowing down the issuance of instructions in the processor. Livelock detection control logic is provided for detecting the occurrence of a livelock condition and slow mode control logic is provided for transitioning the issue unit of a processor from one slow down stage to a next in a slow down staging scheme. At any stage in the slow down staging scheme, if the livelock condition is no longer detected, the processor and issue unit may be transitioned back to a full speed mode of operation. In this way, more performance of the processor may be obtainable by not immediately transitioning to a serial single-step mode of operation.

The processor circuit as described above may be part of the design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design may then be converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips may be distributed by the fabricator in raw wafer form (that is, as a single wafer that has multiple unpackaged chips), as a bare die, or in a packaged form. In the latter case the chip may be mounted in a single chip package (such as a plastic carrier, with leads that are affixed to a motherboard or other higher level carrier) or in a multichip package (such as a ceramic carrier that has either or both surface interconnections or buried interconnections). In any case the chip may then integrated with other chips, discrete circuit elements, and/or other signal processing devices as part of either (a) an intermediate product, such as a motherboard, or (b) an end product. The end product may be any product that includes integrated circuit chips, ranging from toys and other low-end applications to advanced computer products having a display, a keyboard or other input device, and a central processor. Moreover, the end products in which the integrated circuit chips may be provided may include game machines, game consoles, hand-held computing devices, personal digital assistants, communication devices, such as wireless telephones and the like, laptop computing devices, desktop computing devices, server computing devices, or any other computing device.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An issue unit, comprising:
   livelock detection control logic;
   slow mode control logic coupled to the livelock detection logic; and
   an issue and dispatch pipeline coupled to the livelock detection control logic and slow mode control logic, wherein the livelock detection control logic detects a livelock condition in the issue and dispatch pipeline, the slow mode control logic gradually stalls movement of instructions through the issue and dispatch pipeline by an increasing number of processing cycles while the livelock condition continues to be detected by the livelock detection control logic, and wherein the slow mode control logic returns the issue unit to a full speed mode of operation in response to detecting that the livelock condition has been broken.

2. The issue unit of claim 1, wherein the livelock detection logic monitors a completion unit of a processor associated with the issue unit to determine if a predetermined number of processor cycles have occurred without an instruction being completed successfully.

3. The issue unit of claim 2, wherein the livelock detection logic includes a counter for counting a number of processor cycles that have occurred without an instruction being completed successfully as indicated by the completion unit, and wherein a livelock condition is detected in response to the counter reaching a predetermined threshold value.

4. The issue unit of claim 1, wherein the slow mode control logic includes a counter for counting a number of sequential times the livelock condition is detected by the livelock detection logic, and wherein the slow mode control logic increases the number of processing cycles that movement of instructions through the issue and dispatch pipeline is stalled based on incrementing of the counter.

5. The issue unit of claim 1, further comprising:
   other control logic of the issue unit for shifting or stalling movement of instructions through the issue and dispatch pipeline based on other criteria; and
   a logic gate coupled to the other control logic and the slow mode control logic, wherein the logic gate receives inputs from the other control logic and the slow mode control logic indicative of whether to stall or shift instructions through the issue and dispatch pipeline, and wherein the logic gate sends an output signal to the issue and dispatch pipeline to either stall or shift instructions through the issue and dispatch pipeline.

6. An issue unit, comprising:
   livelock detection control logic;
   slow mode control logic coupled to the livelock detection logic; and
   an issue and dispatch pipeline coupled to the livelock detection control logic and slow mode control logic, wherein:
   the livelock detection control logic detects a livelock condition in the issue and dispatch pipeline,
   the slow mode control logic gradually stalls movement of instructions through the issue and dispatch pipeline by an increasing number of processing cycles while the livelock condition continues to be detected by the livelock detection control logic,
   the slow mode control logic returns the data processing device to a full speed mode of operation in response to detecting that the livelock condition has been broken, and wherein the slow mode control logic gradually stalls movement of instructions through the issue and dispatch pipeline by:
   setting the issue unit to a reduced speed mode of operation, in response to the livelock detection control logic detecting the livelock condition, in accordance with a staging scheme, wherein the staging scheme has a plurality of stages that slow down movement of instructions through the issue and dispatch pipeline by differing amounts of processing cycles.

7. The issue unit of claim 6, wherein the slow mode control logic sets the issue unit to a reduced speed mode of operation by:
   placing the issue unit in a first slowed-down stage of operation in which movement of instructions through the issue and dispatch pipeline is delayed by a first number of processing cycles;
   determining if the livelock condition continues to be detected by the livelock detection control logic after placing the issue unit in the first slowed-down stage of operation; and
   placing the issue unit in a second slowed-down stage of operation in which movement of instructions through the issue and dispatch pipeline is delayed by a second number of processing cycles, greater than the first number of processing cycles, if the livelock condition continues to be detected by the livelock detection control logic after placing the issue unit in the first slowed-down stage of operation.

8. The issue unit of claim 6, wherein a last stage of the staging scheme sets the issue unit to a serial single-step mode of operation that allows only one instruction to issue from the issue and dispatch pipeline with no other instructions being allowed to issue from the issue and dispatch pipeline until the instruction is completed.

9. The issue unit of claim 1, wherein criteria for detecting the livelock condition is programmed into the livelock detection control logic after hardware manufacturing of a processor in which the issue unit is a part.

10. The issue unit of claim 6, wherein a base number of processing cycles by which to delay issuance of instructions for each stage of the staging scheme is programmed into the slow mode control logic after hardware manufacturing of a processor in which the issue unit is a part.

* * * * *